United States Patent [19]

Verhaag et al.

[11] Patent Number: 5,521,715
[45] Date of Patent: May 28, 1996

[54] DEVICE AND METHOD FOR REPRODUCING DIGITAL IMAGE DATA

[75] Inventors: Franciscus J. J. Verhaag, Stramproy; Maurice L. M. Luttmer, Venlo, both of Netherlands

[73] Assignee: Oce Netherland, BV, Venlo, Netherlands

[21] Appl. No.: 295,437

[22] Filed: Aug. 25, 1994

[30]     Foreign Application Priority Data

Feb. 25, 1992 [NL] Netherlands ............................ 9200322
Jun. 10, 1992 [NL] Netherlands ............................ 9201022

[51] Int. Cl.$^6$ .............................. H04N 1/21; H04N 1/00; H04N 1/40; H04N 1/393
[52] U.S. Cl. ............................ 358/401; 358/296; 358/447; 358/456; 358/451; 382/299
[58] Field of Search ..................... 358/401, 296, 358/298, 447, 454, 455, 456, 457, 458, 459, 451; 345/127, 129, 130, 132; 382/299, 293

[56]            References Cited

U.S. PATENT DOCUMENTS

| 4,710,821 | 12/1987 | Ohta | 358/256 |
|---|---|---|---|
| 5,123,082 | 6/1992 | Shimada | 395/102 |
| 5,140,648 | 8/1992 | Hackett et al. | 382/47 |
| 5,153,936 | 10/1992 | Morris et al. | 395/128 |
| 5,253,080 | 10/1993 | Nishimura et al. | 358/445 |
| 5,371,612 | 12/1994 | Sakamoto | 358/456 |

FOREIGN PATENT DOCUMENTS

| 1185780 | 7/1989 | European Pat. Off. . |
|---|---|---|
| 0406956 | 1/1991 | European Pat. Off. . |
| 0422793 | 4/1991 | European Pat. Off. . |
| WO91/07843 | 5/1991 | WIPO . |

OTHER PUBLICATIONS

IBM Technical Disclosure Bulletin, vol. 20, #4, Sep. 1977, pp. 1578–1580.

*Primary Examiner*—Edward L. Coles, Sr.
*Assistant Examiner*—Allan A. Esposo
*Attorney, Agent, or Firm*—Birch, Stewart, Kolasch & Birch

[57]            ABSTRACT

Digital image data containing binary pixel values are reproduced, without any loss of detail, by a reproduction unit, such as a laser printer, having a lower base resolution than the resolution of the image data, by subjecting the image data to a resolution conversion, the resolution being reduced in one direction, to a value corresponding to the resolution of the reproduction unit, and enlarged in the remaining direction.

18 Claims, 7 Drawing Sheets

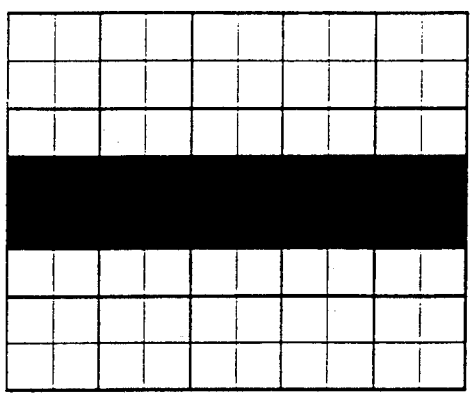
FIG. 8A
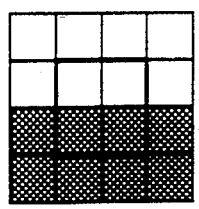 
FIG. 8D  FIG. 8E
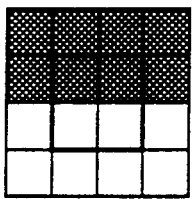 
FIG. 8F  FIG. 8G
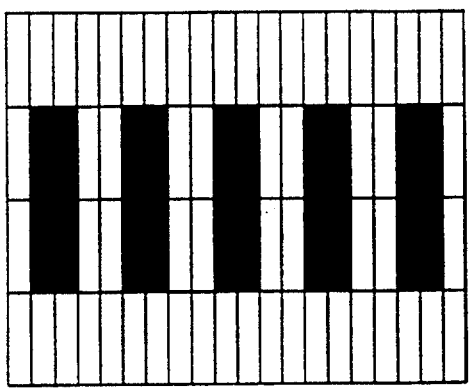
FIG. 8B
FIG. 8C
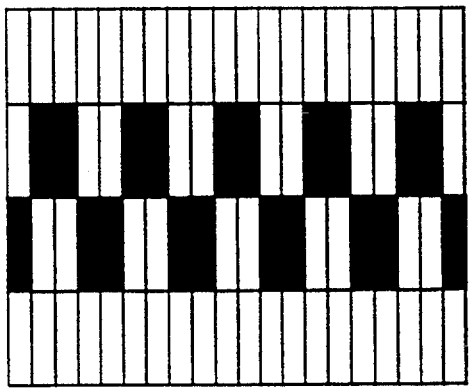
FIG. 8H
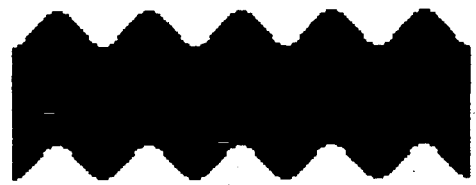
FIG. 8I

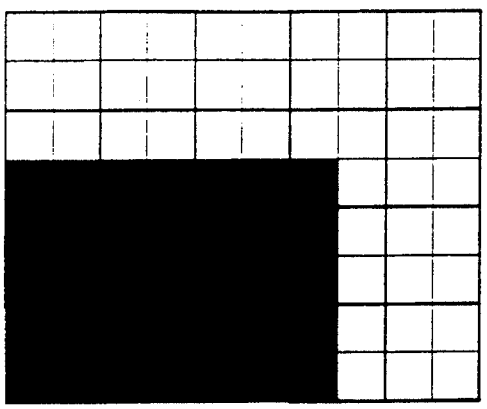
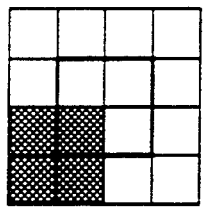 
FIG. 9A      FIG. 9D    FIG. 9E
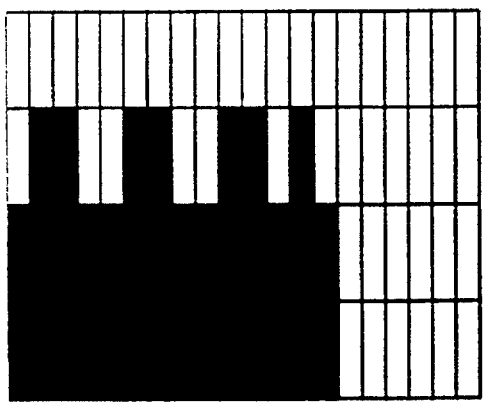
FIG. 9B      FIG. 9C
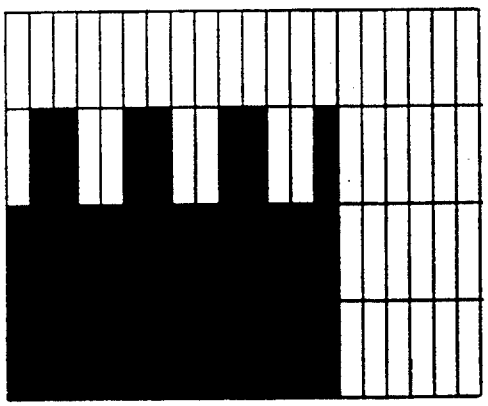
FIG. 9F      FIG. 9G

DEVICE AND METHOD FOR REPRODUCING DIGITAL IMAGE DATA

This application is a continuation-in-part of PCT international application No. PCT/NL93/00032 which has an international filing date of Feb. 15, 1993 which designated the United States, the entire contents of which are hereby incorporated by reference.

BACKGROUND OF THE INVENTION

1. Field of the Invention

The present invention relates to a device and method for reproducing images and, more specifically, to an image reproduction system whereby an image on the basis of digital image data which describes the image in the form of a raster of binary pixels is reproduced.

2. Discussion of Related Art

Devices whereby images are reproduced on the basis of digital image data are generally known. They are provided with inputting means for receiving the digital image data and with a reproduction unit which displays the pixels in their mutual relationship on a reproduction medium, such as a sheet of paper or a video display unit. The pixels in such cases are reproduced in one of two possible forms, e.g., white or black.

Problems arise with this reproduction if the boundaries of white and black image parts do not exactly agree with the separating lines between the pixels, because a pixel can only be reproduced in one form at a time. The boundaries between white and black image parts are thus imaged on the reproduction medium at the separating lines between the pixels. One effect of this is that boundary lines parallel to these separating lines are often shifted somewhat while on the other hand separating lines which extend at an angle over the image are reproduced as a stepped line. The skilled artisan knows this effect as "aliasing".

In many reproduction units the pixels have dimensions such that they can be distinguished separately. As a result, the above-described deviations are visible on the reproduction medium and result in reduced reproduction quality. An obvious step to improve reproduction quality in this respect is to increase the resolution of the pixel raster. Smaller pixels are less readily distinguished and, as a result, the aliasing effect is also reduced. Although the number of pixels, and hence, the number of processing operations, increases as a result with the square of the resolution increase, developments in electronics lead to ever-increasing processing speeds, so that the processing time can be kept within acceptable limits.

One disadvantage of this solution, however, is that a reproduction unit having a higher resolution is much more complex and expensive than a normal reproduction unit. However, this applies mainly in one direction. A reproduction image is built up of a raster of pixels which are displayed in successive (horizontal) lines. A laser printer, for example, contains a photoconductive medium which is charged and then exposed in successive lines by a beam of light modulated in accordance with the pixel values in the image data. Changing the distance between the lines is a far-reaching operation in the system and, hence, difficult and expensive. In another kind of printer, the photoconductive medium is exposed by light generated in an exposure head having LED's arranged in line. The distance between the LED's is a fixed specification of the printer and exposure heads with more LED's per mm are expensive.

In a magnetographic printer, the magnetizable surface of a drum is magnetized by a magnetic head array and then developed with magnetic toner. Such a printer is, e.g., described in U.S. Pat. No. 4,370,661. The density of the magnetic heads in the array fixes the resolution of the printed image. In an inductive printing device, such as the one described in U.S. Pat. No. 4,704,621, a rotatable process drum has a large number of parallel thin electrodes disposed on its surface, the electrodes extending in the direction of movement of the drum and being covered by a dielectric layer. A magnetic roller mounted adjacent the drum and parallel thereto develops the drum surface with toner where and when a voltage is applied to the electrodes. The resolution in the axis direction of the toner image thus formed is fixed by the density of the electrodes. This resolution, which is dictated by the apparatus construction, is henceforth termed the base resolution of the reproduction unit.

SUMMARY OF THE INVENTION

Therefore, it is an object of the present invention to provide a means and method of reproducing digital image data which will overcome the above-noted disadvantages.

It is a further object of the present invention to provide a device for and method of reproducing an image on the basis of digital image data in the form of binary values of pixels.

Yet, another object of the present invention is to provide a reproduction unit having an intrinsic resolution lower than that of the original image data, wherein the perceived resolution of the reproduction is not lower than that of the image, as described by the original image data.

The foregoing objects and others are accomplished in accordance with the present invention, generally speaking, in that a device according to the present invention is provided with an inputting means for receiving digital image data which describes the image in the form of values of binary pixels disposed in a first raster, with a resolution of n1 pixels/mm in a first major direction of the raster and a resolution of m1 pixels/mm in a second major direction of the raster, a resolution conversion unit connected to the inputting means for converting received digital image data into new digital image data which describes the same image in the form of values of binary pixels disposed in a second raster, with a resolution of n2 pixels/mm in a first major direction of this raster and a resolution of m2 pixels/mm in a second major direction of this raster, n2 being larger than n1 and m2 being smaller than m1, and a reproduction unit connected to the resolution conversion unit for displaying the image on a reproduction medium on the basis of the new digital image data received from the resolution conversion unit. In actual fact, the resolution in one direction is, as a result, sacrificed to render possible a resolution increase in the other direction. In these conditions, it is assumed that the original image data has a resolution higher than the base resolution of the reproduction unit and that the lowered resolution m2 can be reproduced with the reproduction unit.

The instant invention makes use of the fact that even in normal reproduction units it is often possible to increase the resolution in the direction perpendicular to the direction in which the resolution is dictated by the apparatus construction. Proceeding from the above-described examples of reproduction units, it is relatively simple, in a laser printer, to increase the frequency of the control signal for the separate pixels within a line. In a LED printer the control frequency of the LED's can just be increased in the direction perpendicular to the lines, i.e., the direction of conveyance of the photoconductive medium, so that the line frequency is increased. Also, in a magnetographic printer or in an inductive printing device, the frequency of the control signals applied to the individual heads or electrodes, respectively, can be increased, whereby a higher resolution in the direction of the drum movement is attained.

As a result of this increase in resolution in one direction of the pixel raster for reproduction, the pixels acquire an elongate shape, i.e., the dimension in the direction in which the resolution cannot be changed remains the same while the dimension in the other direction is reduced. To compensate for the latter, of course, the total number of pixels in that direction must be increased.

Since it is intended that the image as displayed by the reproduction unit should agree in form with the image as described by the original image data, the reproduction unit is adapted to display image data in accordance with a pixel raster in which dimensions of the pixels in the first and second major directions of the raster are in a ratio of $(n1 \times m2)/(n2 \times m1)$ times the ratio of the corresponding dimensions of the pixels of the first raster. With this limitation, an increase or reduction in both directions is at once possible. By applying the step of increasing resolution in one direction, it now appears possible to compensate for the reduction of resolution in the direction perpendicular thereto, so that the effective resolution in that direction is not lower, but in some cases is even higher, than the original resolution of the image data. Even in normal reproduction units, in fact, the increased resolution with this step becomes so high that the reproduction system is no longer capable of accurately reproducing the pixels.

In many laser printers the light spot has dimensions such that the pixels situated around the exposed pixel are overlapped by the spot, so that the photoconductive medium is exposed in accordance with a pattern of effectively lower spatial frequency. In the case of a CRT display, the light spot produced has a dimension which overlaps neighboring pixels, so that the perceived image is also filtered. In an inductive printing device, such a very high resolution pattern appears to be developed as a gray area, which is not recognizable as such, but seemingly extends a black image area placed adjacent to it. A filter effect may also occur in the human perception in the case of a reproduction unit which can accurately reproduce the narrow pixels, provided the pixels are so small that they are no longer individually distinguishable when viewed normally. As a result of this effect, a pattern of alternate white and black pixels in the direction of increased resolution, situated on the boundary of a completely black image part, cannot be distinguished as such. However, it does result in a shift of the perceived boundary line between black and white. This shift is smaller than the dimension in that direction of a pixel.

In the same way, using periodic patterns of black and white pixels, in the direction of the increased resolution in which the distribution of white and black pixels is different from that indicated above, shifts can be obtained in boundary lines over other distances which are smaller than a pixel. This effect results in an effective resolution increase in the direction perpendicular to that of the increased resolution. Such patterns form automatically if the locally average pixel value is kept substantially equal on conversion of the original image data into the new image data, in other words, if care is taken to ensure that the ratio of white and black pixels in the new image data is substantially equal to that ratio in the original image data within a small area of a few pixels.

The use of narrower pixels results in an increase in resolution of the reproduced image in both major directions of the raster, i.e., the line direction or scanning direction, and the direction perpendicular to the lines, or sub-scanning direction. An example of the application of this effect is described in International Patent Application WO 91/07843. In this known system, the values of the reproduction pixels are calculated from an outline description specified in the original image data, a mathematical description of the boundary lines between white and black image parts. Proceeding along a boundary line, in these conditions the values of the pixels on the boundary line are calculated one by one on the basis of the area fraction of such a pixel which is situated within the boundary line. The discretization error in these conditions (a pixel can only be made completely white or black) is added in the area fraction within the boundary line of the next pixel still to be processed. On the basis of this cumulative value, a value is then calculated for that next pixel. This method is tedious and not suitable for determining pixel values in the sequence in which the pixels are reproduced, because the outlines of the image parts must be followed. Also, this method is less suitable for image data which has already been discretized to pixel values, because then the discretization errors incurred in calculating the values of the original pixels are reproduced exactly. With the method according to the present invention, it is possible to compensate for these errors to some extent.

According to one embodiment of the device and method according to the invention, contiguous blocks of A×B original pixels are each time converted into blocks of C×D reproduction pixels, which blocks describe the same part of the image (A,B,C and D integers). For example, blocks of 2×2 original pixels are converted into blocks of reproduction pixels, the line enveloping the first block being identical to the line enveloping the second block.

This can be implemented in several ways. In a first implementation, the values of the A×B original pixels are directly transferred to the C×D new pixels. In this case, there is a fixed relationship between the positions of the original pixels and that of the new pixels receiving their values, which relationship is the same for every block of pixels. For example, a block of two adjacent original pixels situated in two successive scanning lines is converted into a block of equal dimensions, containing two adjacent new pixels situated in one-and-the-same scanning line, and the value of the upper original pixel is always transferred to the left-most new pixel and, consequently, the value of the lower original pixel is always transferred to the right-most new pixel. In this implementation the technical layout of the conversion unit is extremely simple.

In a second implementation, the conversion unit comprises circuitry including a ROM containing a look-up table with patterns of A×B pixel values and a corresponding pattern of C×D pixel values for each A×B pattern stored therein, or logic having the same function. In operation, the values of the A×B original pixels are used as an address signal for the look-up table, which then delivers the values of the C×D new pixels. This implementation gives more freedom to optimize the patterns of new pixels in relation to the properties of the printing system, and becomes especially advantageous when used for blocks of at least 2×2 original pixels (which would be converted into blocks of 4×1 new pixels).

In this example, the number (A×B) of pixels in a first block is equal to that (C×D) in the second, but the invention is not restricted thereto. For example, the second block in this example could also contain, for example, 6×1 or 8×1 reproduction pixels. The increased resolution as a result can be used to absorb known system errors of the reproduction system and could also be used to reproduce the image more accurately. In the latter case, more information concerning the image is desirable than the 2×2 original pixels can give. In another embodiment, therefore, the values of a number of pixels surrounding the pixels to be converted are involved in the choice of values of the reproduction pixels.

Finally, the invention also relates to a conversion unit of the kind used in the above-described device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8A to 8I and FIGS. 9A to 9G illustrate exposure patterns and the printed result using the resolution conversion unit shown in FIG. 7.

DETAILED DISCUSSION OF THE INVENTION

Figure 1:
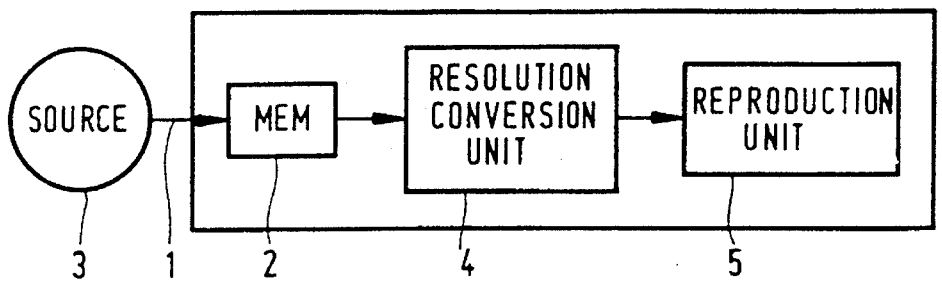
FIG. 1 is a diagram of a device according to the present invention.

FIG. 1 diagrammatically illustrates a device according to the present invention. This device is connected by an input line 1 to a signal source 3 for receiving digital image data therefrom and comprises a memory 2 for intermediate storage of image data delivered by the signal source 3, a resolution conversion unit 4 connected to the memory 2, and a reproduction unit 5 connected to the resolution conversion unit 4.

The digital image data comprises binary pixel values which describe an image to be reproduced in accordance with a raster of pixels having a resolution which is equal in the horizontal and vertical directions in the embodiment described here. The signal source 3 is, for example, a circuit for receiving image information to be printed from a secretarial work station and converting the image information into a raster image or the kind frequently used in printers. The signal source 3 may also be in the form of a scanner with a halftone apparatus, in which case the device according to the invention in conjunction with the signal source 3, forms a digital copying machine.

The digital image data is stored in memory 2 which acts as a buffer between the signal source 3 and the resolution conversion unit 4. If the signal source 3 can supply the image data in accordance with a timetable suitable for the resolution conversion unit, memory 2 can be omitted. The resolution conversion unit 4 reads the digital image data out of the memory, processes it in the manner to be described hereinafter, and delivers it to the reproduction unit 5 in a sequence corresponding to the sequence in which the reproduction unit displays the digital image data.

The reproduction unit 5 is, for example, a laser printer or a raster scan CRT. Other reproduction units are also usable, provided they make a visible image by building it up from pixels disposed in consecutive lines, such pixels being white or black, or light or dark respectively, the resolution in the line direction not necessarily being equal to the resolution transversely of the line direction, i.e., the spatial line frequency.

In the embodiment described here, the image data is supplied by the signal source 3 in the form of pixel values in accordance with a square raster having a resolution of 600×600 dots/inch$^2$ (approximately 24×24 dots/mm$^2$) and after resolution conversion they are imaged by the reproduction unit, a laser printer in this embodiment, on an anisotropic raster of 300×1200 dots/inch$^2$ (approximately 12×48 dots/mm$^2$), the first number referring to the spatial line frequency and the second number to pixel resolution within the lines. The advantage of this is that it is possible to use a conventional printer arranged for a line frequency of 300 lines per inch (12 lines/mm).

Figure 2:
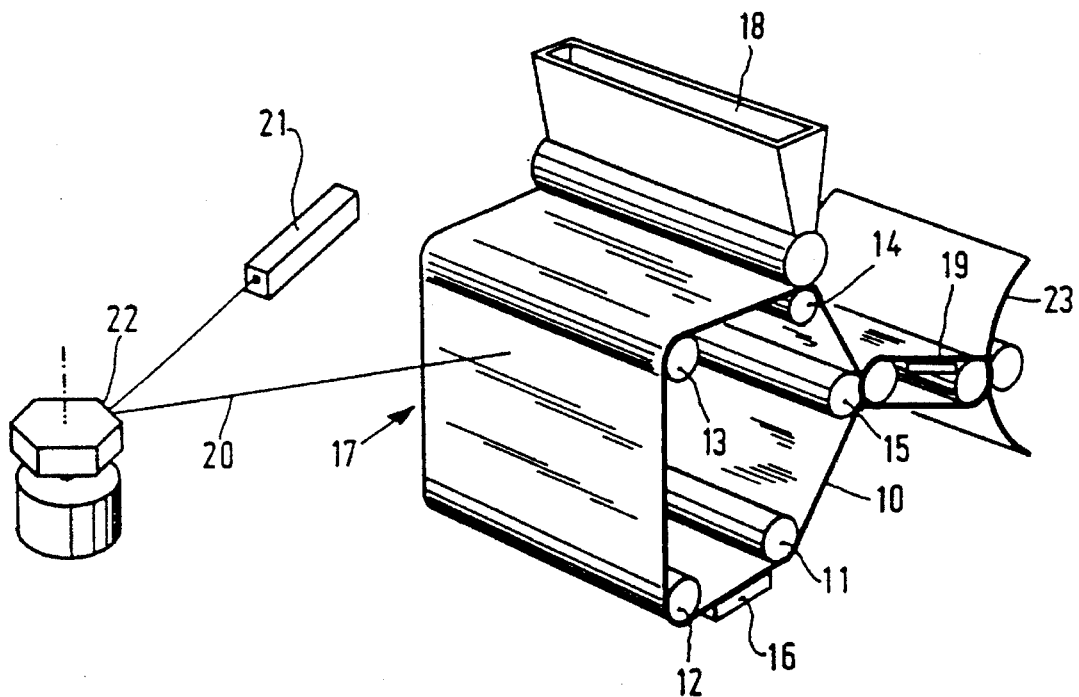
FIG. 2 illustrates a reproduction unit for use in a device according to the present invention.

A laser printer suitable for use as a reproduction unit in a device according to the invention is illustrated in FIG. 2. A belt 10 of photoconductive material is trained over a number of rollers 11, 12, 13, 14, and 15 and is transported over the same past a number of processing stations 16, 17, 18, and 19. The belt 10 is provided with a surface charge at the charging station 16, the charge then being selectively exposed in the exposure station 17 by exposing the belt surface to a beam of light 20 in accordance with raster pattern of the image data. This is done by moving a beam of light 20 from a laser 21 over the surface of the belt in a transverse direction relative to the direction of transport of the belt 10, by means of a rotating mirror 22. The beam of light 20 forms a substantially round or oval light spot on the surface of the photoconductive belt 10, and as a result of the movement of the beam of light the light spot describes a pattern of consecutive scan lines. By modulating the light of beam 20 during the movement, a raster pattern of charged and discharged locations forms on the belt surface. This pattern is then developed with black powder, i.e., toner, at the developing station 18, the charged locations attracting the toner. This process is generally known from electrophotography and will not be described in any further detail here. The toner image formed on the belt 10 is then transferred to an image support 23 in a transfer station 19, thus concluding the printing process.

In this laser printer the image information is reproduced on an anisotropic pixel raster, the dimension of the pixels in the scanning direction of the laser beam being considerably smaller than in the direction perpendicular thereto, the factor being four in the example described.

Figure 3:
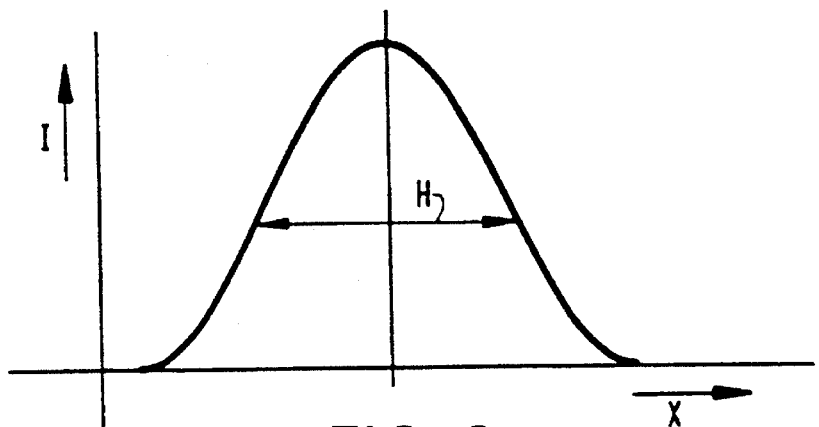
FIG. 3 shows the intensity distribution of the laser light spot in the reproduction unit of FIG. 2, FIGS. 4A–4H show exposure patterns and the printed result.

The intensity distribution of the light spot on the photoconductive belt 10 is shown in FIG. 3. As a function of the distance from the center of the light spot the intensity I has a substantially Gaussian configuration with a half value width H which, in the direction perpendicular to the scanning line, is of the same order of magnitude as the width of a scanning line and somewhat smaller in the direction parallel to the scanning line. The light spot thus falls partially over neighboring pixels. This applies particularly to neighboring pixels in the scanning direction of the laser beam, because of the anisotropic character of the pixel raster. The quantity of light which falls on the pixel is, accordingly, the sum of the exposure of the pixel itself and that of the neighboring pixels. As a result of this overlapping light spot, the exposure function acts as a low-pass filter on the laser control signal. As a result, the separate pixels are often not individually visible. Their presence, however, does affect the printed image in the form of a shift of the boundary between black and white areas. This will now be explained with reference to FIGS. 4A–4H.

Figure 4A:
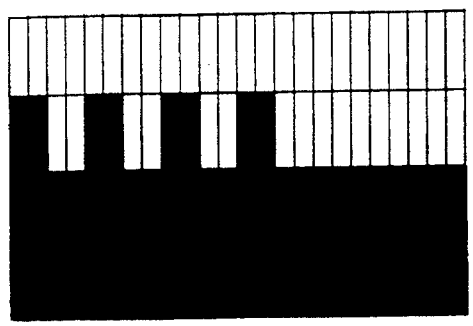
Figure 4B:
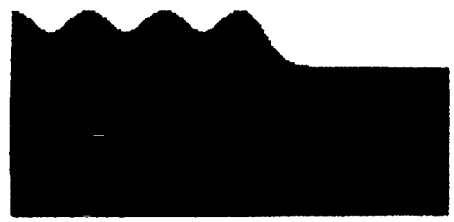
Figure 4C:
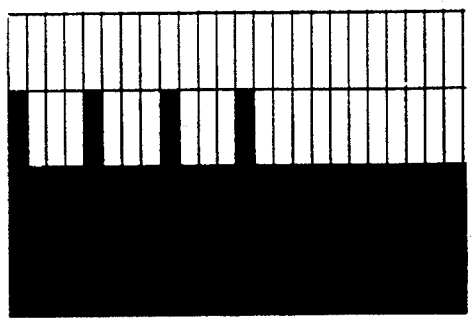
Figure 4D:

FIG. 4A shows a part of a pixel raster having therein pixels which are required to be exposed by the laser beam (white) in accordance with the image data and pixels which are not to be exposed (black). On the boundary between the area to be exposed and the area which is not to be exposed there is a pattern of pixels of which alternately in each case two are to be exposed and two are not to be exposed. If the charged belt surface is exposed with the light spot of FIG. 3 in accordance with the pattern of FIG. 4A, the charge pattern forming on the belt has a gradual transition between the discharged area and the charged area, the toothed shape of the exposure pattern being only faintly recognizable due to the flattening action of the large light spot. The developing station then covers the belt with toner powder at those locations where the electric field above the belt is greater than a critical value applicable to the system. This delivers a visible image, as shown in FIG. 4B, with a slightly wavy boundary line which on average is situated approximately midway along the pixels. Since the pixels are very small, the boundary line appears straight when viewed normally.

Figure 4E:
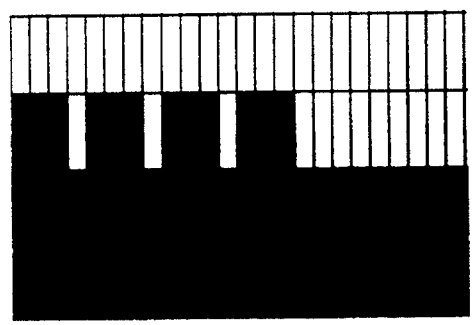
Figure 4F:
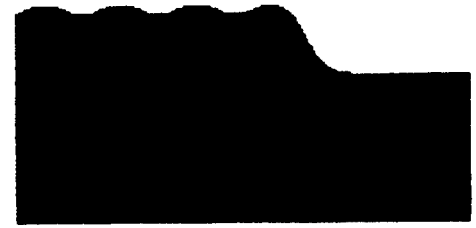
Figure 4G:
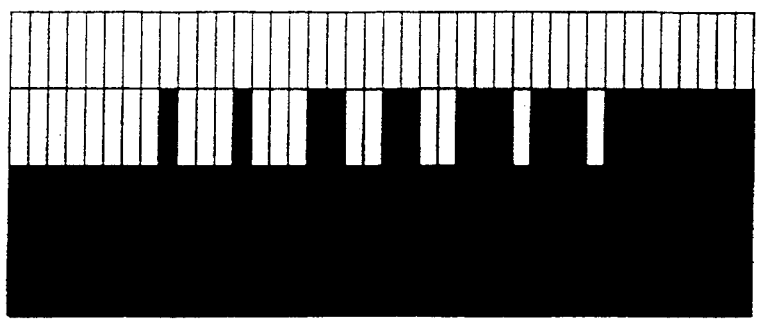
Figure 4H:
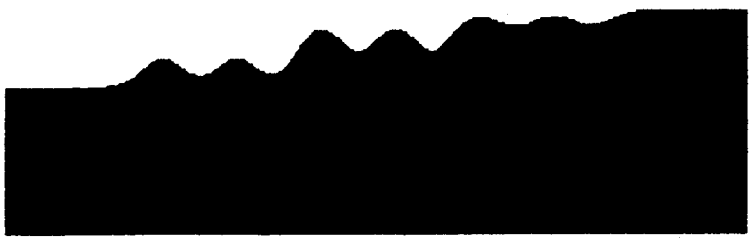

The effect of the pixel pattern on the boundary is therefore that the boundary line on the print is shifted over half a pixel in the direction perpendicular to the scanning direction of the laser beam. With other patterns the location of the printed boundary line may be placed at different positions within a pixel. A pattern of one exposed pixel out of every four, for example, puts the printed boundary line at approximately ¾ of the pixel height (FIG. 4C–4D) and a pattern having three exposed pixels out of every four puts it at ¼ of the pixel height (FIG. 4E–4F). An oblique boundary line can also be formed on the print by a combination of patterns (FIG. 4G–4H). This effect, which is know per se, is termed "half bitting". It provides an increase in resolution in the direction perpendicular to the scanning direction without it being necessary to increase the line frequency. In this way, an image delivered in the form of pixel values with a resolution of 600×600 pixels/inch$^2$ (24×24 pixels/mm$^2$) by the signal source can be printed by a laser printer with a line resolution of 300 lines/inch (12 lines/mm) without any loss of detail.

A first embodiment of the invention is now described with reference to FIGS. 5A–C. The scheme, according to which the original pixel values are converted into the new pixel values, is shown in FIG. 5B. At the left side of this figure a block of 2 original pixels is drawn, numbered 1 and 2. During the conversion, the values of the original pixels are simply transferred to the new pixels having the same number. The blocks of old pixels have the same height-width ratio as do the blocks of new pixels, but they may differ therefrom in size, in the case of enlarging or reducing the image. The entire conversion comprises dividing of the original image into blocks of 2 pixels and converting these blocks into blocks of 2 new pixels in accordance with the shown scheme. The resulting new image has the same size, or at least has the same dimension ratio as the original image. Many other schemes can be used, also schemes that extend over more than one scanning line. An example thereof is shown in FIG. 5C.

Figure 5A:
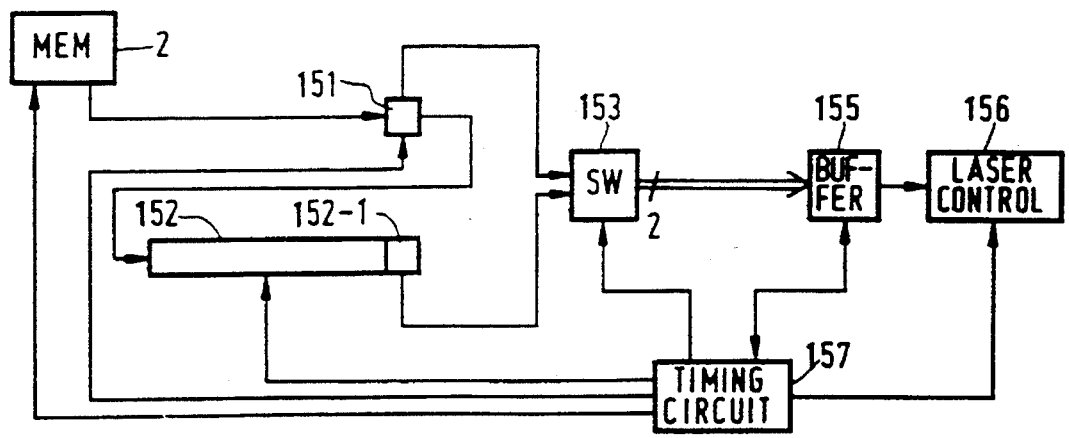
FIG. 5A illustrates a resolution conversion unit according to a first embodiment of the invention.
Figure 5B:
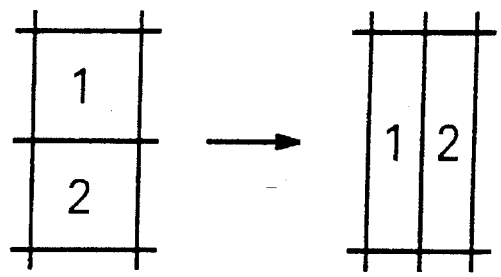
FIG. 5B shows a conversion scheme for use in a resolution conversion unit according to FIG. 5A.
Figure 5C:
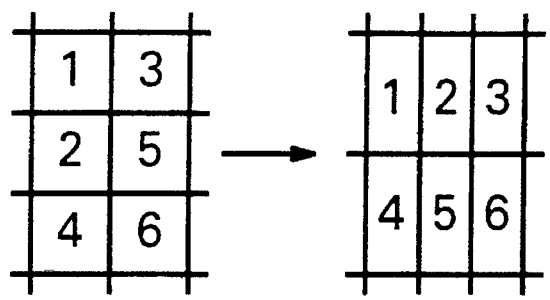
FIG. 5C shows an alternative conversion scheme.

FIG. 5A is a diagram showing a resolution conversion unit which can be used in the above-described device. In this embodiment, two pixels of the image according to the original image data, one situated over the other in two successive scanning lines, are in each case converted into two pixels situated on one scanning line of the reproduction unit, in accordance with the scheme of FIG. 5B. The circuit shown in FIG. 5A is made up of a memory register 151 and a shift register 152. Register 151 is connected by its input to the memory 2 for receiving therefrom the pixel values of the image to be reproduced while its output is connected to the input of the shift register 152. Register 151 and the last cell (152-1) of shift register 152 are connected via a switching circuit 153 to a buffer memory 155. The buffer memory 155 is, in turn, connected to the last control circuit 156. A timing circuit 157 is connected to the memory 2, register 151 and shift register 152, the switching circuit 153, the buffer memory 155 and the last control circuit 156.

The resolution conversion unit operates as follows. On clock pulses from the timing circuit 157 the (binary) pixel values of the image to be reproduced are delivered one by one by memory 2 to the input of the register 151, starting with the first pixel of the first image line, then the second pixel of the first image line, and so on until finally the last pixel of the last image line has been delivered. Shift register 152 contains just an equal number of cells to the number of pixels of an image line, so that exactly one image line fits in the shift register. Register 151 is connected to the first cell of shift register 152, so that on each clock pulse the contents of register 151 are passed to register 152, in which they are advanced on each subsequent clock pulse until reaching cell 152-1. This form is so selected in order to ensure that the cells 151 and 152-1 always contain the values of two pixels of the image situated one over the other.

When the first pixel value of the first image line has reached cell 152-1, the values of the two pixels of the top left-hand corner of the image are situated in the cells 151 and 152-1. At that instant the switching circuit 153 is activated in response to a signal from the timing circuit 157, so that it combines the two (binary) values in the cells to form a code of two bits which form a control signal for the laser control circuit 156, inasmuch as the two bits form the (binary) values of two consecutive (reproduction) pixels on the current scanning line, thus in this case the first two pixels of the first scanning line. This 2-bits code is delivered to buffer memory 155, which stores it until laser control circuit 156 needs it.

On the next clock pulse the pixel values are advanced one position in register 151 and shift register 152, so that the cells 151 and 152-1 now contain the values of the second pixels of the first and of the second image line. Now the switching circuit 153 is again activated and the values in the cells are passed to the buffer memory 155. In this way, the first and second image lines of the image are converted into control signals for the first scanning line of the laser printer.

When the value of the last pixel of the second image line of the image has reached cell 152-1 and has been processed into a control signal for the last two pixels of the first scanning line of the laser printer, an entire image line is then advanced through the registers 151 and 152 without the switching circuit 153 being activated, because two new image lines are always required to generate control signals of a scanning line. Generally, the switching circuit is always activated in this way at the time that the value of the first pixel of an odd image line reaches cell 152-1 and then on each clock pulse up to and including the clock pulse at which the last pixel of the next image line reaches cell 152-1.

It will be apparent that the generation of control signals for the laser printer does not take place continuously, although the signals must be offered continuously and at a fixed frequency to the laser control circuit 156. Consequently, the timing circuit 157 delivers to elements 2 to 153 inclusive and the input stage of element 155 of the circuit, different clock pulses from those delivered to the output stage of element 155 and to element 156. The implementation of this is regarded as coming within the knowledge of the skilled artisan and will not, therefore, be explained in greater detail here. Circuits enabling application of different conversion schemes, like the one of FIG. 5C, can easily be constructed in analogy to the example of FIG. 5A.

Figure 6A:
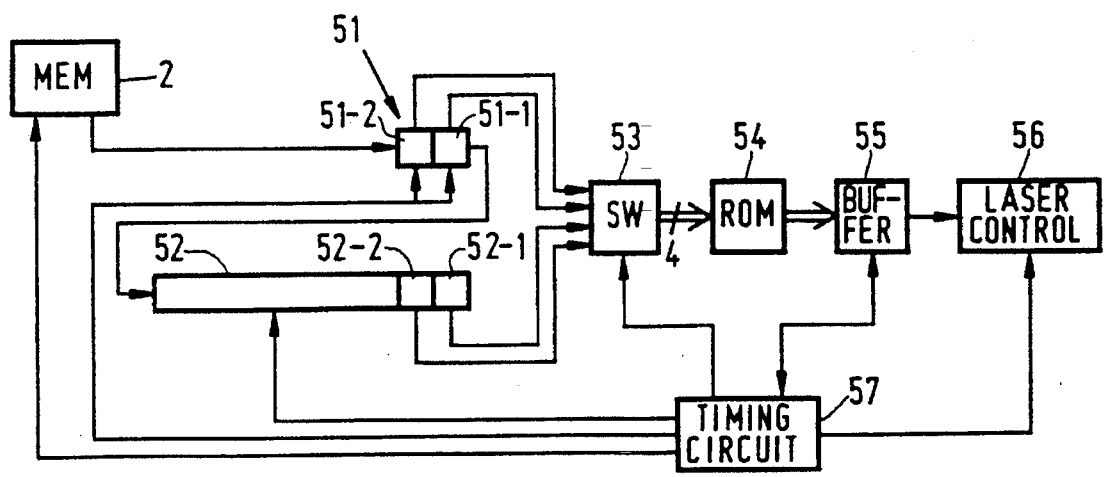
FIG. 6A illustrates a resolution conversion unit according to a second embodiment of the invention.
Figure 6B:
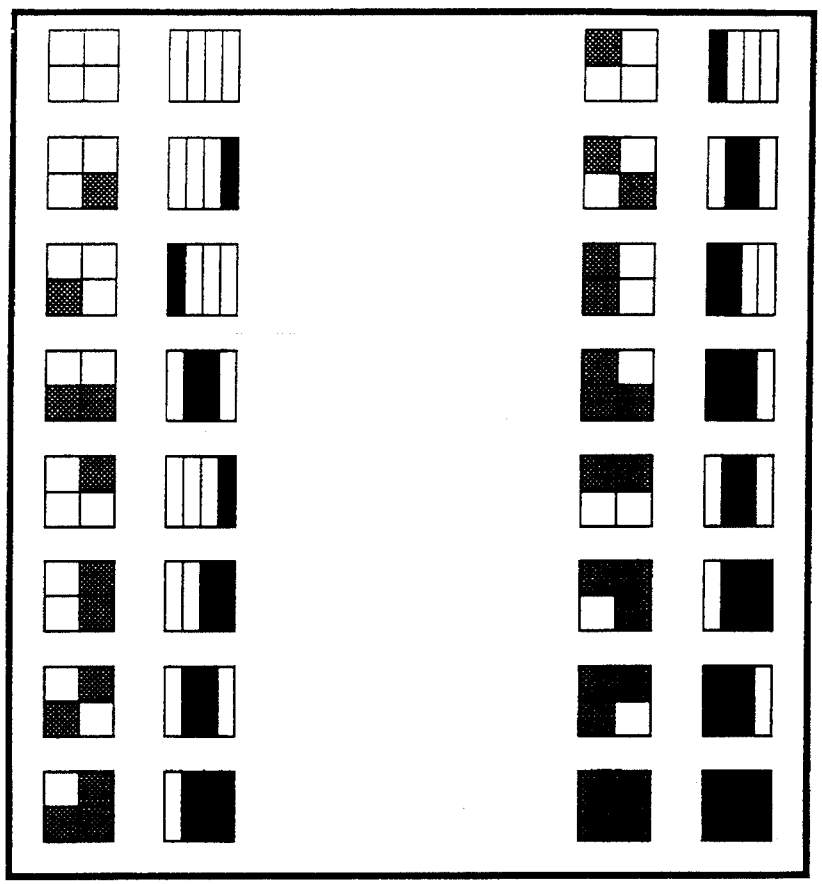
FIG. 6B shows a conversion table for use in a resolution conversion unit according to FIG. 6A.

FIG. 6A is a diagram showing a second embodiment of a resolution conversion unit which can be used in the above-described device. In this embodiment, 2×2 pixels of the image according to the original image data are in each case converted into four pixels situated on a scanning line of the reproduction unit. In these conditions the four reproduction pixels occupy the same position as the 2×2 original pixels. The conversion is in accordance with a predetermined conversion table which for each pattern of 2×2 pixel values contains a corresponding pattern of four consecutive pixel values. In this example, this table is stored in a ROM. FIG. 6B shows a table of this kind. FIG. 6B shows in each case a 2×2 pattern of original pixels (on the left) and a corresponding pattern of reproduction pixels (on the right). The patterns of four reproduction pixels are so selected that, on the one hand, the position information contained in the 2×2 original pixels is retained as far as possible and, on the other hand, the pixels to be printed are as far as possible contiguous, so that the bandwidth of the laser control electronics can be limited.

The circuit shown in FIG. 6A is made up of two shift registers 51 and 52, the first of which (51) is connected by its input to the memory 2 for receiving therefrom the pixel values of the image to be reproduced while its output is connected to the input of the second shift register 52. The two cells 51-1 and 51-2 of shift register 51 and the last two cells (52-1 and 52-2) of shift register 52 are connected via a switching circuit 53 to the address input of a ROM 54, the output of which is connected to a buffer memory 55. The buffer memory 55 is, in turn, connected to the laser control circuit 56. A timing circuit 57 is connected to the memory 2, the shift registers 51 and 52, the switching circuit 53, the buffer memory 55 and the last control circuit 56.

This circuit operates as follows. On clock pulses from the timing circuit 57 the (binary) pixel values of the image to be reproduced are delivered one by one by memory 2 to the input of the shift register 51, starting with the first pixel of the first image line, then the second pixel of the first image line, and so on until finally the last pixel of the last image line has been delivered. Shift register 52 contains just an equal number of cells to the number of pixels of an image line, so that exactly one image line fits in the shift register. The last cell (51-1) of register 51 is connected to the first cell of register 52, so that on each clock pulse the contents of cell 51-1 are passed to register 52, in which they are advanced on each subsequent clock pulse until reaching cell 52-1. This form is so selected in order to ensure that the four cells 51-1, 51-2, 52-1 and 52-2 always contain the values of four pixels situated in a square in the image.

When the first pixel value of the first image line has reached cell 52-1, the values of the four pixels of the top left-hand corner of the image are situated in the cells 51-1, 51-2, 52-1 and 52-2. At that instant the switching circuit 53 is activated in response to a signal from the timing circuit 57, so that it combines the four (binary) values in the cells to form a code and passes this as an address signal to the memory 54. At the associated address in the memory 54 there is stored beforehand a code of four bits which form a control signal for the laser control circuit 56, inasmuch as the four bits form the (binary) values of four consecutive (reproduction) pixels on the current scanning line, thus in this case the first four pixels of the first scanning line. The contents of the memory 54 agree with the table shown in FIG. 6B.

On the next clock pulse the pixel values are advanced one position in the shift registers 51 and 52, so that the cells 51-1, 51-2, 52-1 and 52-2 now contain the values of the pixels 2 and 3 of the first and of the second image line, but in this case the switching circuit 53 is not activated, so that it does not deliver a signal to the memory 54. On the following clock pulse the pixel values are again advanced one position by the shift registers, so that now the values of pixels 3 and 4 of the first two image lines reach cells 51-1, 51-2, 52-1 and 52-2. The switching circuit 53 is then again activated and the values in the cells are passed to the memory 54 which, in turn, again delivers a four-bit control signal relating to the next four pixels of the first scanning line to the buffer memory 55. In this way, the first and second image lines of the image are converted into control signals for the first scanning line of the laser printer.

When the value of the last pixel of the second image line of the image has reached cell 51-2 and has been processed into a control signal for the last four pixels of the first scanning line of the last printer, an entire image line is then advanced through the shift registers without the switching circuit 53 being activated, because two new image lines are always required to generate control signals of a scanning line. Generally, the switching circuit is always activated in this way at the time that the value of the first pixel of an odd image line reaches cell 52-1 and then on each second clock pulse up to and including the clock pulse at which the last pixel of the next image line reaches cell 51-2.

It will be apparent that the generation of control signals for the laser printer does not take place continuously, although the signals must be offered continuously and at a fixed frequency to the laser control circuit 56. Consequently, the timing circuit 57 delivers to elements 2 to 54 inclusive and the input stage of element 55 of the circuit, different clock pulses from those delivered to the output stage of element 55 and to element 56. The implementation of this is regarded as coming within the knowledge of the skilled artisan and will, therefore, not be explained in greater detail here.

Figure 7:
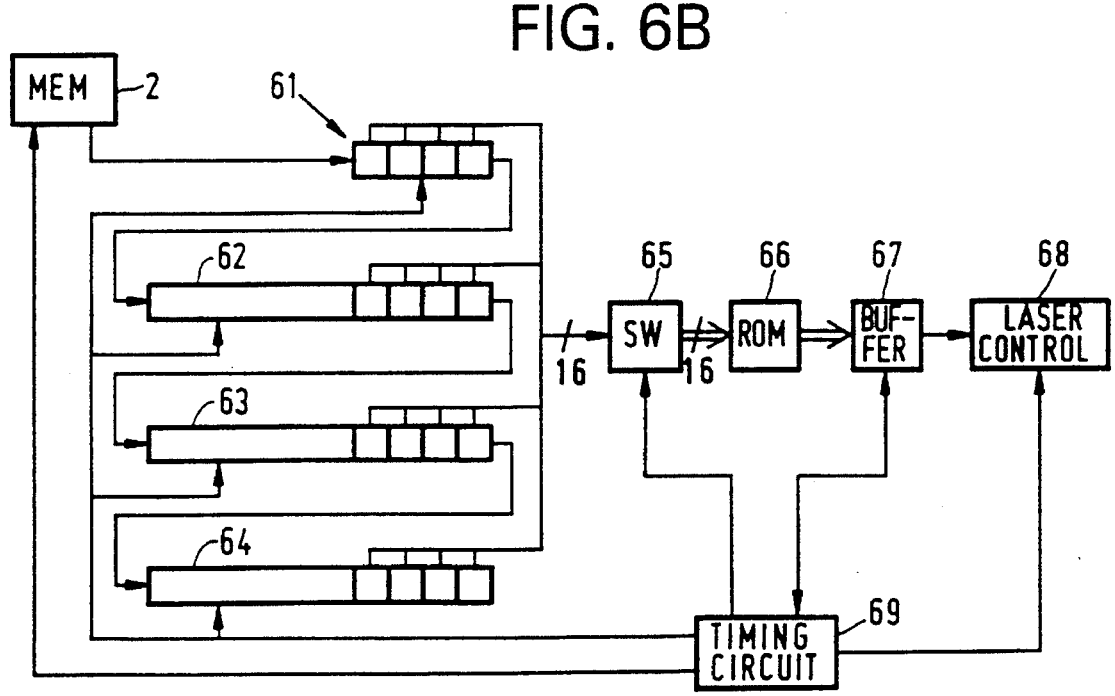
FIG. 7 illustrates a resolution conversion unit according to a third embodiment of the invention.

A third embodiment of the resolution conversion unit is shown in FIG. 7. In this embodiment, as in the previous embodiment, blocks of 2×2 pixels of the image are converted in accordance with the original image data into four pixels situated on a scanning line of the reproduction unit, the four reproduction pixels occupying the same position as the 2×2 original pixels. In this third embodiment, however, the values of the pixels situated around the 2×2 pixels to be converted are involved in determining the pattern of reproduction pixels. In this way, it is possible to achieve better detail reproduction by selection of adapted patterns of reproduction pixels. This will be explained by reference to a number of examples.

In FIG. 8A a part of an image to be processed is shown with a line of two pixels width thereon. This line is so situated that its width is divided into two by the blocks of 2×2 input pixels. When this part of the image is converted into reproduction pixels in accordance with the table in FIG. 6B, the pattern shown in FIG. 8B forms. This pattern consists of blocks of pixels which are isolated from one another. The printing result thereof is shown in FIG. 8C. The block structure of the pixel pattern causes the printed line to have a clearly visible lumpy structure. This can be avoided by using a conversion table which is addressed with a pattern of 4×4 input pixels, of which the 2×2 pixels to be converted form the center and which contains patterns of reproduction pixels so selected that unwanted effects of the kind described above do not occur. Two patterns of input pixels which play a part in the case of FIG. 8A are shown in FIG. 8D and FIG. 8F and deliver a pattern of reproduction pixels in accordance with FIG. 8E and FIG. 8G, respectively. With this table, the line of FIG. 8A is converted into the patten in FIG. 8H which, in turn, leads to a printing result shown in FIG. 8I. In this the printed line is less lumpy.

A second example is shown in FIG. 9A–9G. FIG. 9A shows a pattern of input pixels in which there is an angular structure. The use of the table shown in FIG. 6B results in a pattern of reproduction pixels, as shown in FIG. 9B, which is printed as shown in FIG. 9C. In this, the angle is rounded off somewhat by the unfortunate positioning of the single pixel in the processing block in which the angle is situated. The new table contains a pattern of input pixels (FIG. 9D) which corresponds to a pattern of reproduction pixels adapted to an angle (FIG. 9E). In this way, it is possible to form an output pattern (FIG. 9F) which is a much better reproduction of the angle, as will be apparent from the print result shown in FIG. 9G.

In a variant of this embodiment the 4×4 input pixel values are converted into a series of eight instead of four reproduction pixels situated on a scanning line, such pixels being narrower than the pixels described hereinbefore, so that together they nevertheless again occupy the space of 2×2 input pixels. A greater register accuracy can be obtained in this way. Weaknesses in the electrophotographic process can also be subtly compensated in this way by making extra reproduction pixels black in pixel patterns which are reproduced insufficiently dark.

The circuit according to the third embodiment (FIG. 7) differs from that shown in FIG. 6A in that there are now four shift registers 61–64 in series. The four cells of shift register 61 and the last four cells of the shift registers 62, 63 and 64 are connected to a switching circuit 65. This combines the 16 binary pixel values from these cells into a code for addressing the memory 66, in which there is now stored a table with patterns of 4×4 input pixels and corresponding patterns of four reproduction pixels situated in a scanning line. Examples of such patterns are those shown in FIGS. 8D/8E, FIGS. 8F/8G and FIGS. 9D/9E. Instead of a memory, it is of course possible to use a logic circuit to generate the reproduction pixels. The buffer memory 67, the laser control circuit 68 and the timing circuit 69 fulfill a function similar to that of the corresponding elements in FIG. 6A.

The operation of this circuit will now be discussed. For the conversion of all the pixels of the image use is made of neighboring pixels therearound. The pixels situated at the edge of the image have no neighboring pixels one or two sides. Consequently, prior to processing, the image data in the memory 2 are first expanded by the resolution conversion unit with pixels which form an edge of the width of one pixel around the image and have the value 1. This expanded image data is then processed by the circuit shown in FIG. 7. This takes place as follows. In response to clock pulses from the timing circuit 69 the (expanded) pixel values are read out one by one from the memory 2 and input to the shift register 61 and then advanced through the shift registers 61 to 64. The shift registers 62 to 64 are again each just as long as one line of input pixels. When the first pixel of the first image line reaches the last cell of register 64, the switching circuit 65 is activated so that it combines the 16 pixel values in the four cells of register 61 and in the last four cells of registers 62, 63 and 64 to form a 16-bit code and with this controls memory 66 which in turn delivers a control signal for the laser control circuit 68 to buffer memory 67. The timing circuit 69 then activates the switching circuit 65 on each second clock pulse up to and including the clock pulse at which the last pixel of the fourth image line arrives in the first cell of register 61. At that moment, the first scanning line of reproduction pixels is formed.

The switching circuit 65 is then always activated at the instant that the first pixel of an even image line arrives in the last cell of register 64 and on each second clock pulse thereafter for a series of (N-2) clock pulses, where N is the number of pixels in an image line. Of course, the number of input pixels involved in the choice of the pattern of reproduction pixels can be extended in order, thus better to be able to take into account structures in the original image. This can yield a further improvement in print quality, particularly in conjunction with the above-mentioned expansion of the number of reproduction pixels. The circuitry required for this is readily designed by the skilled artisan and will not, therefore, be discussed in further detail.

The above-described method and device enable a pixel pattern to be reproduced without any loss of detail by means of a reproduction unit having a basic resolution lower than the resolution of the pixel pattern. In certain cases, it is even possible to compensate for discretization errors in the original pixel pattern. Even when the original pixel pattern contains half bit patterns, similar to the patterns shown in FIG. 4A, 4C, 4E and 4G, these patterns are automatically converted into half bit patterns in the new pixel raster and the effect intended with these patterns is retained.

Although the invention has been explained by reference to the above-described examples, it is not restricted thereto. It will be clear to the skilled artisan that other embodiments are possible within the spirit of the present invention. These embodiments are intended to be included within the scope of the following claims.

We claim:

1. A device for reproducing an image, comprising (1) inputting means for receiving digital image data which describes said image, (2) processing means connected to said inputting means for processing said digital image data, and (3) a reproduction unit connected to said processing means for displaying said image on a reproduction medium on the basis of processed image data in raster form received from said processing means, using a raster of elongated pixels, characterized in that said inputting means are adapted to receive said digital image data having the form of values of binary pixels disposed in a first raster, with a resolution of n1 pixels/mm in a first major direction of said first raster and a resolution of m1 pixels/mm in a second major direction of said first raster, wherein said processing means comprise a resolution conversion unit for converting said digital image data into processed image data which describe the same image in the form of values of binary pixels disposed in a second raster, with a resolution of n2 pixels/mm in a first major direction of said second raster and a resolution of m2 pixels/mm in a second major direction of said second raster, n2 being larger than n1 and m2 being smaller than m1, and wherein the reproduction unit is adapted to display processed image data in accordance with a third raster of pixels having dimensions in the first and second major directions of said third raster, respectively, of which the ratio is substantially equal to (n1×m2)/(n2×m1) times the ratio of corresponding dimensions of pixels of said first raster.

2. A device according to claim 1, characterized in that said resolution conversion unit is adapted to maintain the locally average pixel value substantially equal on conversion of said original image data into said processed image data.

3. A device according to claim 2, characterized in that said resolution conversion unit is provided with storage means for storing at least one block of A×B pixels of the original image data and conversion means connected to said storage means to convert said block of A×B pixels into a block of C×D pixels of the processed image data which describes the same part of the image as said block of A×B pixels, where A, B, C and D are integers.

4. A device according to claim 3, wherein said conversion means comprises a circuit which transfers the values of the pixels of said original image data to pixels of the processed image data in accordance with a fixed, self-repeating scheme.

5. A device according to claim 3, wherein said conversion means comprises a circuit which, when controlled with the values of the said A×B pixels, delivers a pattern of C×D pixel values corresponding to said values.

6. A device according to claim 3, wherein said conversion means comprises a circuit which, when controlled with the values of the said A×B pixels and a number of pixels surrounding said pixels, delivers a pattern of C×D pixel values corresponding to said values.

7. A device according to claims 3, 5 or 6, wherein A×B is equal to C×D.

8. A device according to any one of claims 3 to 6, wherein one of the numbers C and D is equal to 1 and the other thereof is larger than 1.

9. A resolution conversion unit as described and implemented in any of the devices according to any one of claims 3 to 6.

10. A method of reproducing an image described by original digital image data, comprising processing said original digital image data and displaying said image on a reproduction medium on the basis of said processed image data using a raster of elongated pixels, wherein said digital image data describes said image in the form of values of binary pixels disposed in a first raster having a resolution of n1 pixels/mm in a first major direction of said first raster and a resolution of m1 pixels/mm in a second major direction of said first raster, and wherein said processing comprises converting said original image data into processed image data which describes the same image in the form of values of binary pixels disposed in a second raster, with a resolution of n2 pixels/mm in a first major direction of said second raster and a resolution of m2 pixels/mm in a second major direction of said second raster, n2 being larger than n1 and m2 being smaller than m1, said pixels of said second raster having dimensions in said first and second major directions of said second raster, respectively, of which the ratio is substantially equal to (n1×m2)/(n2×m1) times the ratio of corresponding dimensions of pixels of said first raster.

11. The method according to claim 10, wherein a locally average pixel value is maintained substantially equal on conversion of said original image data into said processed image data.

12. A method according to claim 11, wherein each time a block of A×B pixels of said original image data is converted into a block of C×D pixels of said processed image data, said block of C×D pixels describing the same part of the image as said block of A×B pixels, where A, B, C and D are integers.

13. A method according to claim 12, wherein values of the original pixels are mapped onto the pixels of said processed image data in a one-to-one correspondence, according to a fixed, self-repeating scheme.

14. A method according to claim 12, including prior compilation of a table of patterns of A×B pixel values with at least one corresponding pattern of C×D pixel values for each pattern and, on conversion of said original image data into said processed image data, each time for a block of A×B pixels of the original image data, searching the pattern of pixel values of that block in said table and assigning values to the pixels of the corresponding block of C×D pixels of said processed image data in accordance with a corresponding pattern from said table.

15. A method according to claim 14, wherein more than one pattern of C×D pixel values is stored in said table corresponding to a pattern of A×B pixel values and wherein during conversion of original image data into processed image data a selection is made from the corresponding patterns of C×D pixel values for a block of A×B pixels of said original image data by reference to the values of pixels from the original image data surrounding said A×B pixels.

16. A method according to claim 12, characterized by prior compilation of a table of patterns of E×F pixel values where E and F are integers and E×F is larger than A×B, with at least one corresponding pattern of C×D pixel values for each pattern and, on conversion of original image data into processed image data, searching, each time for a block of E×F pixels of said original image data, for the pattern of pixel values of that block in said table and assigning values to the pixels of a block of C×D pixels of said processed image data, corresponding to a block of A×B pixels of said original image data contained in the said block of E×F pixels, in accordance with a corresponding pattern from said table.

17. A method according to claim 12, 14, 15 or 16, wherein A×B is equal to C×D.

18. A method according to any one of claims 12 to 16, wherein one of the numbers C and D is equal to 1 and the other thereof is larger than 1.

* * * * *